US006941457B1

(12) United States Patent
Gundavelli et al.

(10) Patent No.: US 6,941,457 B1
(45) Date of Patent: Sep. 6, 2005

(54) ESTABLISHING A NEW SHARED SECRET KEY OVER A BROADCAST CHANNEL FOR A MULTICAST GROUP BASED ON AN OLD SHARED SECRET KEY

(75) Inventors: Srinath Gundavelli, San Jose, CA (US); David McNamee, Hollister, CA (US)

(73) Assignee: Cisco Technology, Inc., San Jose, CA (US)

( * ) Notice: Subject to any disclaimer, the term of this patent is extended or adjusted under 35 U.S.C. 154(b) by 804 days.

(21) Appl. No.: 09/608,831

(22) Filed: Jun. 30, 2000

(51) Int. Cl.$^7$ .............................. H04L 9/00; H04K 1/00
(52) U.S. Cl. ..................... 713/163; 380/28; 380/278; 380/282; 380/283
(58) Field of Search ........................... 713/163; 380/28, 380/278, 282, 283

(56) References Cited

U.S. PATENT DOCUMENTS

| | | | |
|---|---|---|---|
| 4,200,770 A | | 4/1980 | Hellman et al. |
| 4,531,020 A | * | 7/1985 | Wechselberger et al. .... 380/239 |
| 4,578,531 A | | 3/1986 | Everhart et al. |
| 4,776,011 A | | 10/1988 | Busby |
| 4,881,263 A | | 11/1989 | Herbison et al. |
| 5,309,516 A | * | 5/1994 | Takaragi et al. .............. 380/45 |
| 5,351,295 A | | 9/1994 | Perlman et al. |
| 5,361,256 A | | 11/1994 | Doeringer et al. |
| 5,588,060 A | | 12/1996 | Aziz |
| 5,588,061 A | | 12/1996 | Ganesan et al. |

(Continued)

FOREIGN PATENT DOCUMENTS

| | | |
|---|---|---|
| EP | 0 952 718 A2 | 10/1999 |
| EP | 0 994 600 A2 | 4/2000 |

OTHER PUBLICATIONS

Koblitz, Neal. A Course in Number Theory and Cryptography. 1994. Springer–Verlag New York Inc. $2^{nd}$ edition. 22–23.*

Koblitz, Neal. A Course in Number Theory and Cryptography. 1994. Springer–Verlag New York Inc. 2nd edition. 22–23.*

Alfred J. Menezes, "Handbook of Applied Cryptography," 1997, CRC Press LLC., pp. 519–520.

(Continued)

*Primary Examiner*—Gilberto Barrón, Jr.
*Assistant Examiner*—Benjamin E. Lanier
(74) *Attorney, Agent, or Firm*—Hickman Palermo Truong & Becker LLP

(57) ABSTRACT

An optimized approach for arriving at a shared secret key in a dynamically changing multicast or broadcast group environment is disclosed. In one aspect of the invention, a method is provided for communicating through a secure channel between members of a dynamically changing multicast group connected over an insecure network. The method provides that a first shared secret key for establishing a first multicast group is computed that includes a set of one or more first members. Based on the first shared secret key, a first multicast group exchange key is also generated. Upon receiving a first user exchange key from a first user requesting entry into the first multicast group, a second secret key, based on the first user exchange key and the first shared secret key is computed. The first multicast group exchange key is sent to the first user and used by the first user to generate the same second shared secret key. Through the use of the second shared secret key a second multicast group is established whose members include the first user and the set of one or more first members of the first multicast group as the second shared secret key provides a first secure channel for communicating between members of the second multicast group over the insecure network.

53 Claims, 6 Drawing Sheets

U.S. PATENT DOCUMENTS

| | | | |
|---|---|---|---|
| 5,600,642 A | | 2/1997 | Pauwels et al. |
| 5,630,184 A | | 5/1997 | Roper et al. |
| 5,633,933 A | * | 5/1997 | Aziz ............................ 380/30 |
| 5,663,896 A | * | 9/1997 | Aucsmith ................... 713/201 |
| 5,724,425 A | | 3/1998 | Chang et al. |
| 5,748,736 A | | 5/1998 | Mittra |
| 5,761,305 A | | 6/1998 | Vanstone et al. |
| 5,805,578 A | | 9/1998 | Stirpe et al. |
| 5,841,864 A | | 11/1998 | Klayman et al. |
| 5,850,451 A | | 12/1998 | Sudia |
| 5,889,865 A | | 3/1999 | Vanstone et al. |
| 5,920,630 A | | 7/1999 | Wertheimer et al. |
| 5,987,131 A | | 11/1999 | Clapp |
| 6,009,274 A | | 12/1999 | Fletcher et al. |
| 6,049,878 A | | 4/2000 | Caronni et al. |
| 6,055,575 A | | 4/2000 | Paulsen et al. |
| 6,088,336 A | * | 7/2000 | Tosey |
| 6,119,228 A | * | 9/2000 | Angelo et al. |
| 6,151,395 A | * | 11/2000 | Harkins |
| 6,216,231 B1 | * | 4/2001 | Stubblebine |
| 6,226,383 B1 | | 5/2001 | Jablon |
| 6,240,188 B1 | * | 5/2001 | Dondeti et al. ............. 380/284 |
| 6,256,733 B1 | * | 7/2001 | Thakkar et al. |
| 6,263,435 B1 | * | 7/2001 | Dondeti et al. ............. 713/163 |
| 6,272,135 B1 | * | 8/2001 | Nakatsugawa |
| 6,279,112 B1 | * | 8/2001 | O'Toole, Jr. et al. |
| 6,295,361 B1 | * | 9/2001 | Kadansky et al. .......... 380/278 |
| 6,330,671 B1 | * | 12/2001 | Aziz ........................... 713/163 |
| 6,332,163 B1 | * | 12/2001 | Bowman-Amuah |
| 6,363,154 B1 | | 3/2002 | Peyravian et al. |
| 6,483,921 B1 | * | 11/2002 | Harkins |
| 6,507,562 B1 | * | 1/2003 | Kadansky et al. |
| 6,584,566 B1 | * | 6/2003 | Hardjono ..................... 713/163 |
| 6,633,579 B1 | * | 10/2003 | Tedijanto et al. |
| 6,636,968 B1 | | 10/2003 | Rosner et al. |
| 6,643,773 B1 | * | 11/2003 | Hardjono |
| 6,684,331 B1 | * | 1/2004 | Srivastava ................... 713/163 |

OTHER PUBLICATIONS

Bruce Schneier, "Applied Cryptography," 1996, John Wiley & Sons, Inc., pp. 33–35 and 47–65.

U.S. Patent Office, Office Action from Appl. No. 09/393,411 (cover page and Office Action Summary), dated Nov. 6, 2003, 2 pages.

U.S. Patent Office, Office Action from Appl. No. 09/393,411 (cover page and Office Action Summary), dated Sep. 8, 2003, 2 pages.

U.S. Patent Office, Office Action from Appl. No. 09/393,410 (cover page and Office Action Summary), dated Nov. 7, 2003, 2 pages.

U.S. Patent Office, Office Action from Appl. No. 09/393,410 (cover page and Office Action Summary), dated Sep. 3, 2003, 2 pages.

Whitfield Diffie, et al., "New Directions in Cryptography," IEEE Transactions On Information Theory, vol. IT–22, No. 6, Nov. 1976, pp. 29–40.

Whitfield Diffie, "The First Ten Years of Public–Key Cryptography," Proceedings of the IEEE, vol. 76, No. 5, May 1988, pp. 560–577.

Silvio Micali, "Guaranteed Partial Key–Escrow", MIT/LCS/TM–537, Laboratory for Computer Science, Aug. 1995, Handout #13, 14 pages.

Mihir Bellare, et al., "Verifiable Partial Key Escrow," Proceedings of the Fouth Annual Conference on Computer and Communications Security, ACM, 1997 Nov. 1996, pp. 1–22.

U.S. Department of Commerce, National Institute of Standards and Technology, Federal Information Processing Standards Publication 185 Feb. 9, 1994, 8 pages.

Cylink Corporation, "Alternatives to RSA: Using Diffie–Hellman with DSS," 11 pages.

Robert Orfali et al., "The Essential Distributed Objects Survival Guide," 1996, pp. 448–449.

David Chappell, "Understanding Microsoft Windows 2000 Distributed Services," 2000, pp. 319–324.

Robert Orfali et al., "Client/Server Survival Guide Third Edition," 1999, p. 488.

* cited by examiner

ESTABLISHING A NEW SHARED SECRET KEY OVER A BROADCAST CHANNEL FOR A MULTICAST GROUP BASED ON AN OLD SHARED SECRET KEY

RELATED APPLICATIONS

This application is related to: (1) non-provisional application Ser. No. 10/715,932, filed Nov. 17, 2003, entitled "Operational Optimization of a Shared Secret Diffie-Hellman Key Exchange Among Broadcast or Multicast Groups," naming Sunil K. Srivastava as inventor, and (2) non-provisional application Ser. No. 10/715,721, filed Nov. 18, 2003, entitled "Processing Method for Key Exchange Among Broadcast or Multicast Groups that Provides a More Efficient Substitute for Diffie-Hellman Key Exchange," naming Sunil K. Srivastava as inventor.

FIELD OF THE INVENTION

The invention generally relates to cryptographic communication systems. The invention relates more specifically to a key exchange approach for providing secure communication among broadcast or multicast groups in a communications network.

BACKGROUND OF THE INVENTION

The proliferation of network computing has shaped how society transacts business and engages in personal communication. As reliance on computer networks grows, the flow of information between computers continues to increase in dramatic fashion. Accompanying this increased flow of information is a proportionate concern for network security. Commercial users, who regularly conduct business involving the exchange of confidential or company proprietary information over their computer networks, demand that such information is secure against interception by an unauthorized party or corruption. In addition, with the acceptance of such applications as electronic commerce over the global Internet, all users recognize the critical role cryptographic systems play in maintaining the integrity of network communication.

The goal of cryptography is to keep messages secure. A message can be defined as information or data that is arranged or formatted in a particular way. In general, a message, sometimes referred to as "plaintext" or "cleartext", is encrypted or transformed using a cipher to create "ciphertext," which disguises the message in such a way as to hide its substance. In the context of cryptography, a cipher is a mathematical function that can be computed by a data processor. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

Many different encryption/decryption approaches for protecting information exist. The selection of an encryption/decryption scheme generally depends upon considerations such as the types of communications to be made more secure, the particular parameters of the network environment in which the security is to be implemented, and the desired level of security. Since the level of security often has a direct effect on system resources, an important consideration is the particular system on which a security scheme is to be implemented.

For example, for small applications that require a relatively low level of security, a traditional restricted algorithm approach may be appropriate. With a restricted algorithm approach, a group of participants agree to use a specific, predetermined algorithm to encrypt and decrypt messages exchanged among the participants. Because the algorithm is maintained in secret, a relatively simple algorithm may be used. However, if secrecy of the algorithm is compromised, the algorithm must be changed to preserve secure communication among the participants. Scalability, under this approach, is problematic; that is, as the number of participants increases, keeping the algorithm secret and updating it when compromises occur place an undue strain on network resources. In addition, standard algorithms cannot be used because each group of participants must have their own unique algorithm.

To address the shortcomings of traditional restricted algorithm approaches, many contemporary cryptography approaches use a key-based algorithm. Basically, two types of key-based algorithms exist: (1) symmetric and (2) asymmetric, such as public key. As a practical matter, a key forms one of the inputs to a mathematical function that a computer or processor uses to generate a ciphertext.

Public key algorithms are designed so that the key used for encryption is different than the key used for decryption. The decryption key cannot be determined from the encryption key, at least not in any reasonable amount of time using reasonable computing resources. Typically, the encryption key (public key) is made public so that anyone, including an eavesdropper, can use the public key to encrypt a message. However, only a specific participant in possession of the decryption key (private key) can decrypt the message.

Public key algorithms, however, are not often employed as a mechanism to encrypt messages largely because such algorithms consume an inordinate amount of system resources and time to encrypt entire messages. Further, public key encryption systems are vulnerable to chosen-plaintext attacks, particularly when there are relatively few possible encrypted messages.

As a result, a public key cryptosystem is utilized to establish a secure data communication channel through key exchanges among the participants. That is, two or more parties, who wish to communicate over a secure channel, exchange or make available to each other public (or non-secure) key values. Each party uses the other party's public key value to privately and securely compute a private key, using an agreed-upon algorithm. The parties then use their derived private keys in a separate encryption algorithm to encrypt messages passed over the data communication channel. Conventionally, these private keys are valid only on a per communication session basis, and thus, are referred to as session keys. These session keys serve to encrypt/decrypt a specified number of messages or for a specified period of time. For instance, in a typical scenario, two users or participants A and B seek to communicate over a secure channel in which user A wants to send a message to B. Thus, user A is considered a publisher of a message to user B, who is acting as a subscriber. The public key algorithm establishes a secure channel between publisher, A, and subscriber, B, as follows:

1. B provides a public key, B, to A.

2. A generates a random session key SK, encrypts it using public key B and sends it to B.

3. B decrypts the message using private key, b (to recover the session key SK).

4. Both A and B use the session key SK to encrypt their communications with each other, each user discards the session key after completing the communication.

The above approach provides the added security of destroying the session key at the end of a session, thereby providing greater protection against unauthorized access by eavesdroppers.

A known public key exchange method is the Diffie-Hellman algorithm described in U.S. Pat. No. 4,200,770. The Diffie-Hellman method relies on the difficulty associated with calculating discrete logarithms in a finite field. According to this method, two participants, A and B, each select random large numbers a and b, which are kept secret. A and B also agree (publicly) upon a base number p and a large prime number q, such that p is primitive mod q. A and B exchange the values of p and q over a non-secure channel or publish them in a database that both can access. Then A and B each privately compute public keys A and B, respectively, as follows:

$$A \text{ privately computes a public key } A \text{ as: } A = p^a \mod (q) \quad (1)$$

$$B \text{ privately computes a public key } B \text{ as: } B = p^b \mod (q) \quad (2)$$

A and B then exchange or publish their respective public keys A and B and determine private keys $k_a$ and $k_b$ as follows:

$$A \text{ computes a private key } k_a \text{ as: } k_a = B^a \mod (q) \quad (3)$$

$$B \text{ computes a private key } k_b \text{ as: } k_b = A^b \mod (q) \quad (4)$$

As evident from equation (3), A's private key is a function of its own private random number, a, and the public key, B. Likewise, equation (4) indicates that B's private key depends on its own private number, b, and the public key of A. As a result, A and B arrive at the shared secret key. Substituting for A and B of equations (3) and (4) using equations (1) and (2), respectively yields:

$$k_a = (p^b \mod (q))^a \mod (q) \text{ and } k_b = (p^a \mod (q))^b \mod (q)$$

$$k_a = p^{ba} \mod (q) \text{ and } k_b = p^{ab} \mod (q)$$

Therefore, $k_a = k_b$.

Using the Diffie-Hellman protocol, A and B each possesses the same secure key $k_a$, $k_b$, which can then be used to encrypt messages to each other. An eavesdropper who intercepts an encrypted message can recover it only by knowing the private values, a or b, or by solving an extremely difficult discrete logarithm to yield a or b. Thus, the Diffie-Hellman protocol provides a secure approach for the exchange of keys.

FIG. 1 is a flow diagram that shows a way to use the Diffie-Hellman protocol in a broadcast context involving three users Alice, Bob, and Carol. The approach is applicable to any number of users, however, three users are shown for clarity and simplicity. Initially, as illustrated in block 100, each of the participants Alice, Bob, and Carol randomly generates private integers, a, b, and c, respectively. At block 102, a prime number "q" and integer "p" are agreed upon by the users. These values serve as seed values for later computations.

Thereafter, as illustrated in blocks 104–108 (not necessarily in this order), Alice computes and forwards her public key to Bob, Bob computes and forwards his public key to Carol and Carol computes and forwards her public key to Alice, as follows:

$$X = p^a \mod (q) \quad (5)$$

$$Y = p^b \mod (q) \quad (6)$$

$$Z = p^c \mod (q) \quad (7)$$

In blocks 110–114 (again, not necessarily in this order), user Alice computes Z', which equals $Z^a \mod (q)$, and sends it to Bob. Bob computes X', which equals $X^b \mod (q)$, and sends it to Carol. Carol computes Y', which equals $Y^c \mod (q)$, and sends it to, Alice.

As illustrated in block 116, all the users arrive at a shared secret key, k, by computing the following:

$$\text{Alice computes } k: k = Y'^a \mod (q) = p^{abc} \mod (q) \quad (8)$$

$$\text{Bob computes } k: k = Z'^b \mod (q) = p^{abc} \mod (q) \quad (9)$$

$$\text{Carol computes } k: k = X'^c \mod (q) = p^{abc} \mod (q) \quad (10)$$

After these series of exchanges, all the three involved parties end up with the same secret key (k). An intruder who is monitoring these exchanges would not be able to compute the same key as all the involved parties. The security of Diffie-Hellman key agreement relies on the difficulty of computing discrete logarithms.

However, although the Diffie-Hellman key-exchange algorithm may be used to establish a secure channel in a network environment comprising multiple nodes, the algorithm requires at least N×(N−1) rounds of point-to-point unicast messages between the member nodes. With three nodes, as in this instance, a total of six (6) messages are exchanged as each member node communicates its public key to the other members of the group. For larger broadcast or multicast groups, this method of key-exchange requires extensive message traffic and may introduce appreciable networking delay. For example, with six nodes, the standard broadcast Diffie-Hellman approach requires that a total of thirty (30) messages be exchanged between the members of the group.

Furthermore, when the algorithm is applied to a dynamically changing group of node members, such that members are routinely joining and leaving the group, the entire series of steps need to be repeated every time a new member is added to the group. Thus, whenever a new member is allowed to join an existing group, the standard Diffie-Hellman broadcast approach again requires N×(N−1) rounds of point-to-point unicast messages to sent between the node members. For example, using the standard broadcast Diffie-Hellman approach, to establish a secure channel in a network environment comprising six nodes, a total of thirty (30) messages must be exchanged between the members of the group. In addition, if a seventh node requests entry into the group, the algorithm requires that an additional forty-two (42) messages be exchanged to allow the seventh node to join the existing group. Thus, the algorithm as currently known simply requires too many key exchanges and is not scalable.

One approach for reducing the number of messages that are required to establish a secure channel in a network environment comprising multiple node members is described in co-pending U.S. Patent Application "Operational Optimization of a Shared Secret Diffie-Hellman Key Exchange Among Broadcast or Multicast Groups," Ser. No. 09/393,410, filed Sep. 10, 1999, by Srivastava.

Based upon the foregoing, there is a clear need for an improved method for exchanging key information that will minimize network processing delays, especially among broadcast or multicast groups whose members dynamically change over time.

There is also an acute need for an improved approach that will enhance the scalability of establishing a secure communication channel for dynamically changing broadcast or multicast groups.

There is further a need for providing a secure communication link that provides a high level of security while requiring relatively fewer system resources and less time to the secure communication link.

SUMMARY OF THE INVENTION

According to one aspect of the invention, a method is provided for communicating through a secure channel between members of a dynamically changing multicast group connected over an insecure network.

In this aspect, a first shared secret key for establishing a first multicast group is computed that includes a set of one or more first members. Based on the first shared secret key, a first multicast group exchange key is also generated. Upon receiving a first user exchange key from a first user requesting entry into the first multicast group, a second secret key, based on the first user exchange key and the first shared secret key is computed. The first multicast group exchange key is sent to the first user and used by the first user to generate the same second shared secret key. Through the use of the second shared secret key a second multicast group is established whose members include the first user and the set of one or more first members of the first multicast group as the second shared secret key provides a first secure channel for communicating between members of the second multicast group over the insecure network.

According to one feature of this aspect, the step of establishing a second multicast group requires a total of approximately N+1 messages for providing the first secure channel for communicating between members of the second multicast group over the insecure network.

In another aspect, a second multicast group exchange key based on the second shared secret key is generated. When a second user exchange key from a second user requesting entry into the second multicast group is received, a third secret key based on the second user exchange key and the second shared secret key is computed. The second multicast group exchange key is sent to the second user and used to generate the same third shared secret key. Through the use of the third shared secret key a third multicast group is established whose members include the second user and the members of the second multicast group as the third shared secret key provides a second secure channel for communicating between members of the third multicast group over the insecure network.

According to another aspect, upon determining that a first departing member has left the second multicast group a private multicast group non-zero random integer is selected. A second multicast group exchange key is then generated based on a private multicast group non-zero random integer, a public non-zero integer and a public prime integer. The second multicast group exchange key is then broadcast to each remaining member of the second multicast group for computing a third secret key that is based on the second multicast group exchange key and the second shared secret key. Through the use of the third shared secret key a third multicast group is established whose members include only remaining members of the second multicast group as the third shared secret key provides a second secure channel for communicating between members of the third multicast group over the insecure network.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

An approach for key exchange based upon a public key algorithm, such as the Diffie-Hellman protocol, is optimized to enhance operation in terms of speed of processing as well as scaling of a multicast or broadcast group. In one aspect, a method and mechanism is provided for establishing a secret key over a broadcast channel. As explained below, the mechanism reduces the number of key exchanges that are typically required for establishing a secret key for a broadcast or multicast group and is well suited for providing a secure communication channel for broadcast or multicast groups whose members are dynamically changing.

Key Exchange in Multicast Groups

Figure 1:
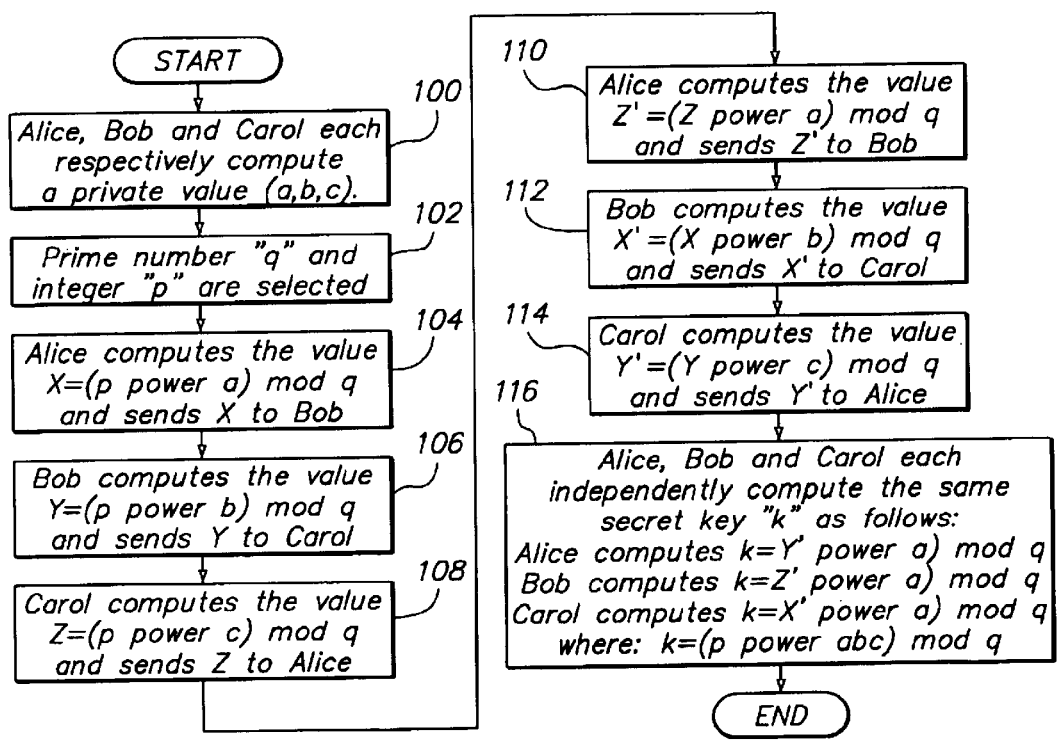
FIG. 1 is a flow diagram showing the Diffie-Hellman method of key exchange as applied to a broadcast context.
Figure 2:
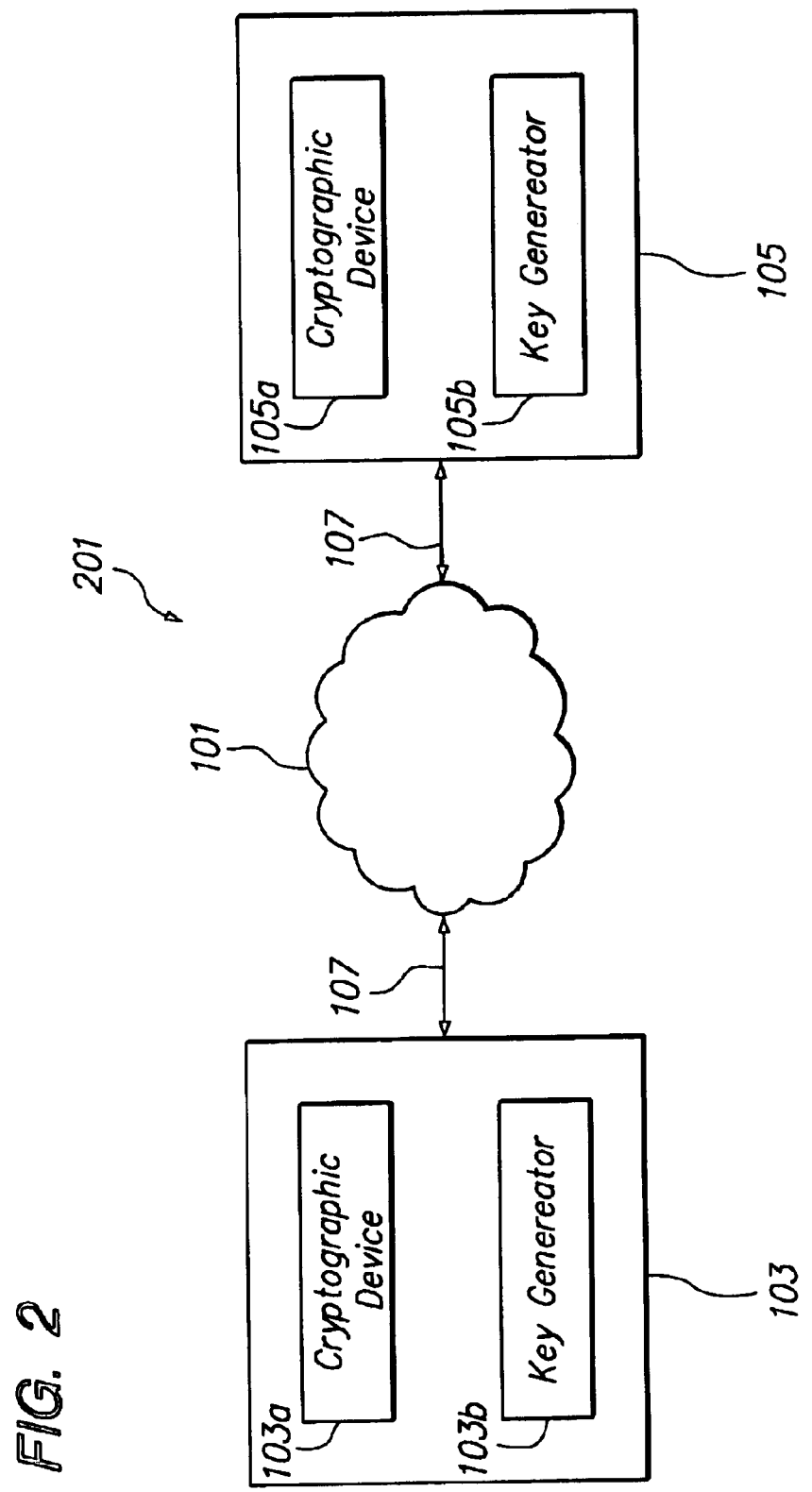
FIG. 2 is a block diagram illustrating a security mechanism for providing secure communication between two members of a multicast group.

FIG. 2 illustrates a secure communication system 201 for establishing a shared secret key value between two participants of a multicast group, according to an embodiment of the present invention. Two participants are shown as an example, however, any number of users, clients, or nodes may be used.

User A, employing workstation 103, communicates with another workstation 105 of user B over a communication link 107. Link 107 is established over network 101. Network 101 may be a local area network (LAN), a wide area network (WAN), the global packet-switched network known as the Internet, a wireless transmission medium, or any other medium for exchanging information between the participants. In addition, link 107 may be non-secure, thereby allowing third party access to information transmitted by the link 107, or alternatively, link 107 may be secure.

As seen in FIG. 2, workstations 103, 105 have components with complementary functions. Workstation 103 (user A) includes a key generator 103*b* and a cryptographic device 103*a*. Key generator 103*b* generates public and private keys used for encrypting and decrypting information exchanged with workstation 105 (user B). Cryptographic device 103*a* encrypts and decrypts information exchanged with workstation 105 using private and public keys generated by key generator 103*b*. Similarly, workstation 105 includes a key generator 105*b* and a cryptographic device 105*a*. Key generator 105*b* supplies public and private keys that are used to establish a secured link 107 with workstation 103. Information exchanged with workstation 103 is encrypted and decrypted by cryptographic device 105*a* using private and public keys generated by key generator 105*b*.

According to certain embodiments, participants 103 and 105 use a modified Diffie-Hellman method to exchange their keys. Using this approach, participants 103 and 105, along with other requesting participants, can securely exchange information over link 107 using a public key exchange protocol.

As shown in FIG. 3A, FIG. 3B, FIG. 3C, FIG. 3D, a public key exchange protocol addresses two nodes at a time to reduce the number of messages that are conventionally exchanged between a dynamically changing multicast group. In a preferred embodiment, the protocol is based mathematically on the Diffie-Hellman method. In the example of FIG. 3A, FIG. 3B, FIG. 3C, FIG. 3D, a group of users Alice 302, Bob 306, Carol 314, Dave 322 desire to join in a conference in which they can communicate securely with each other over a broadcast channel. In one embodiment, the broadcast channel is established over an insecure network, for example the Internet, in which unauthorized data "sniffing" may exist.

Members join the multicast group one after another. For example, the multicast group dynamically changes from a single user Alice 302 (FIG. 3A) to a group of users Alice 302, Bob 306, Carol 314, Dave 322 (FIG. 3D). However, embodiments do not require that any specific number of members be present in the initial group. For example, in certain embodiments the initial group of members may include any number of users that have previously exchanged keys to establish a secure channel.

Figure 3A:
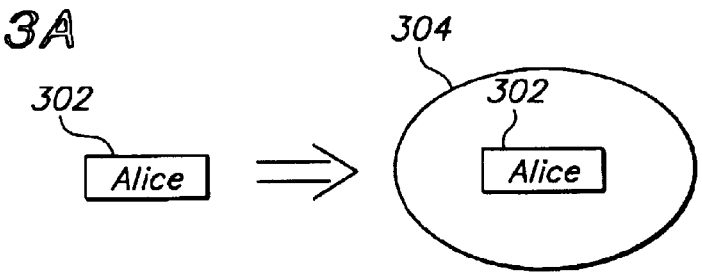
FIG. 3A is a diagram that illustrates a method for determining a shared private key when a user is dynamically added to a multicast group.

Referring now to FIG. 3A, an initial multicast group 304 is created in which Alice 302 is the first member to join the group. To create the initial multicast group 304, no messages need to be exchanged, as the group is initially established with a single user (Alice 302). In one embodiment, as part of creating multicast group 304, Alice 302 chooses a random number x and computes the value X', where $X'=g^x$ mod n. The value g is an integer, and n is a prime number that has been agreed upon between the initial group. In certain embodiments, the values of g and n are made public such that their values are generally known by users requesting entry into the multicast group.

For purposes of illustrating an example, assume that the value of integer g is "5," the value of prime number n is "563," and the value of random number x is "7." Thus, the value of X' is:

$$X'=5^7 \bmod 563=431 \quad (11)$$

In this example, because Alice 302 is initially the only member of multicast group 304, the value of X' is used as the initial shared secret key k (i.e., k is set equal to "431").

However, it should be noted that in certain embodiments, because Alice is the only member in the initial group, instead of computing the value of X' as indicated above in sequence (11), she may instead select a random number to be used as the initial shared secret key k value. For explanation purposes, it shall be assumed that the random number selected by Alice is "431" and thus the initial shared secret key value k equals "431".

The shared secret key k is then used to compute a public key K' that can be exchanged with other parties, where $K'=g^k$ mod n. Thus, the value of public key K' is:

$$K'=5^{431} \bmod 563=220 \quad (12)$$

Figure 3B:
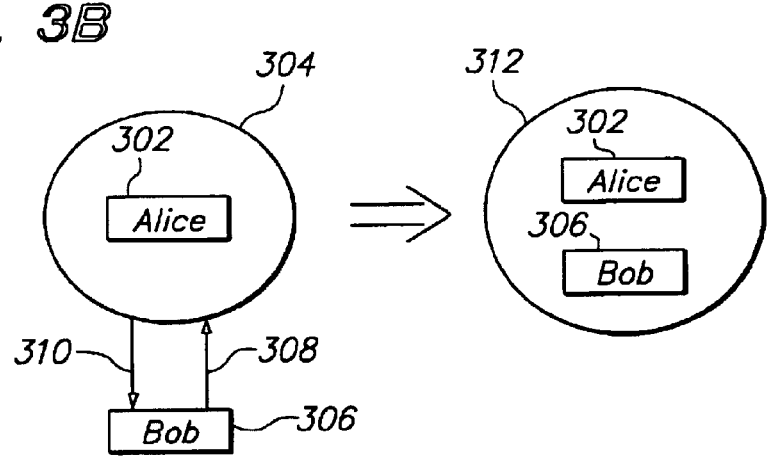
FIG. 3B is diagram that illustrates a method for determining a shared private key when a user is dynamically added to a multicast group.

As depicted in FIG. 3B, after the initial multicast group 304 is established, a second user (Bob 306) requests to join the multicast group 304. In one embodiment, to request access, Bob 306 chooses a random integer y and computes an exchange key Y', where $Y'=g^y$ mod n. For purposes of illustrating an example, assume that the value chosen by Bob 306 for random number y is "13". Thus, the value of exchange key Y' is calculated by Bob 306 as:

$$Y'=5^{13} \bmod 563=332 \quad (13)$$

Thereafter, Bob 306 transmits a request 308, that includes exchange key Y', for entry into multicast group 304. Upon receiving the request 308, multicast group 304 determines whether Bob 306 is to be admitted into the multicast group. In one embodiment, a member of the multicast group 304 is selected for determining whether a particular requesting user is to be admitted into the multicast group. For example, the first or the last user that was admitted as a member of the multicast may be tasked with verifying entries for requesting users. The particular method used for selecting which member has such responsibility is not critical.

If the multicast group 304 determines that Bob 306 is to be admitted, one of the multicast group members (in this example, Alice 302) responds to a request for admission by Bob 306 by transmitting a response 310 that includes the exchange key K' of the multicast group. In addition, each member of the multicast group 304 uses the exchange key Y' to generate a new shared secret key k1, where $k1=(Y'^k \bmod (n))$, for communicating with other members of the group. Thus, the value of the new shared secret key k1 is calculated by multicast group 304 as follows:

$$k1=332^{431} \bmod (563)=408 \quad (14)$$

where $$k1=(y'^k \bmod (n))=(g^{ky} \bmod (n))$$

Upon receiving response 310 from multicast group 304, Bob 306 uses the exchange key K' to generate the new shared secret key k1, where $k1=(K'^y \bmod (n))$, for communicating with other members of the group (multicast group 312). Thus, the value of the new shared secret key k1 is calculated by Bob 306 as follows:

$$k1=220^{13} \bmod (563)=408 \quad (15)$$

where $$k1=(K'^y \bmod (n))=(g^{ky} \bmod (n))$$

Figure 3C:
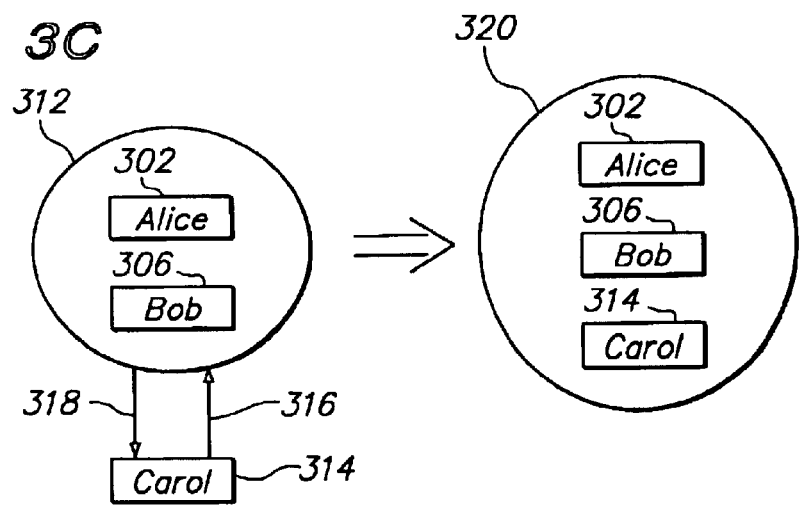
FIG. 3C is diagram that illustrates a method for determining a shared private key when a user is dynamically added to a multicast group.
Figure 3D:
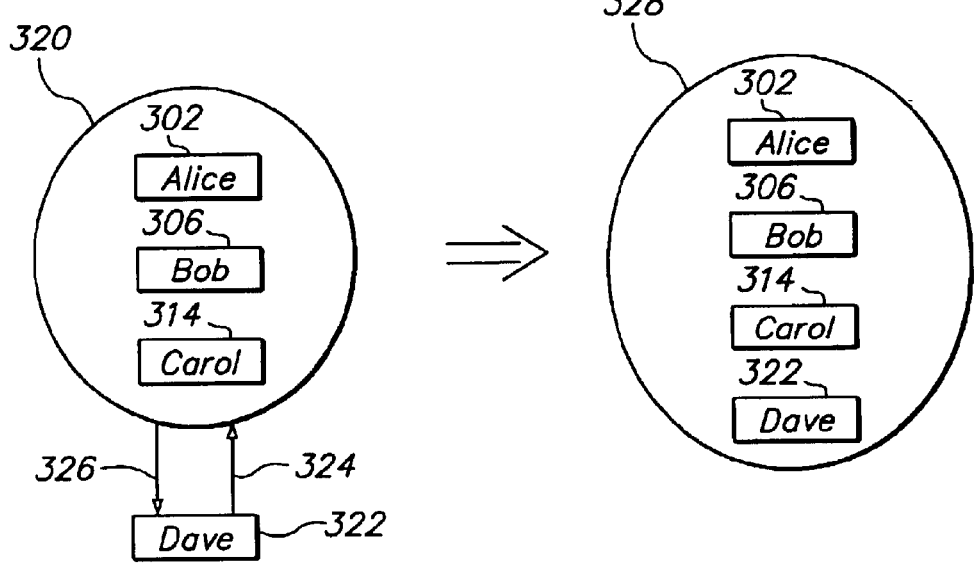
FIG. 3D is diagram that illustrates a method for determining a shared private key when a user is dynamically added to a multicast group.

As depicted in FIG. 3C, after the multicast group 312 is established, a third user (Carol 314) requests to join the multicast group 312. In one embodiment, to request access, Carol 314 chooses a random integer z and computes an exchange key Z', where Z'=($g^z$ mod (n)). For purposes of illustrating an example, assume that the value chosen by Carol 314 for random number z is "11." Thus, the value of exchange key Z' calculated by Carol 314 is:

$$Z'=5^{11} \bmod (563)=261 \quad (16)$$

Carol 314 transmits a request 316 that includes exchange key Z', for entry into multicast group 312. Upon receiving the request 316, multicast group 312 determines whether Carol 314 may be admitted into the multicast group. In one embodiment, a member of the multicast group is selected for broadcasting the exchange key of a requesting user (admitted user) to the other members of the multicast group. For example, the member that is responsible for receiving requests from users outside the multicast group may also be made responsible for broadcasting exchange keys that are received from requesting users that are authorized for entry into the multicast group. Alternatively, the requesting user (Carol 314) may be required to communicate its exchange key with each of the current members of the multicast group (Alice 302, Bob 306). As such, request 316 may represent a plurality of messages, for example one for each current member of the multicast group. The methodology used to select a member to have responsibility for broadcasting exchange keys is not critical.

If the multicast group 312 determines that Carol 314 is to be admitted, one of the multicast group members (in this example, either Alice 302 or Bob 306) responds to the request of Carol 314 by transmitting a response 318 that includes the multicast group's 312 exchange key K1', where K1'=($g^{k1}$ mod (n)). For example, K1' equals ($5^{408}$ mod (563)=541).

In addition, each member of the multicast group 312 uses the exchange key Z' to generate a new shared secret key k2, where k2=($Z'^{k1}$ mod (n)), for communicating with other members of the group. Thus, the value of the new shared secret key k2 is calculated by multicast group 312 as follows:

$$k2=261^{408} \bmod (563)=296 \quad (17)$$

where $$k2=(Z'^{k1} \bmod (n))=(g^{kyz} \bmod (n))$$

Upon receiving response 318 from multicast group 312, Carol 314 uses the exchange key K1' to generate the new shared secret key k2, where k2=($K1'^{z}$ mod (n)), for communicating with other members of the group. Thus, the value of the new shared secret key k2 calculated by Carol 314 is:

$$k2=541^{11} \bmod (563)=296 \quad (18)$$

where $$k2=(K'^{z} \bmod (n))=(g^{kyz} \bmod (n))$$

As depicted in FIG. 3D, after the multicast group 320 is established, a fourth user (Dave 322) requests to join the multicast group 320. In one embodiment, to request access, Dave 322 chooses a random integer w and computes an exchange key W', where W'=($g^w$ mod (n)). For purposes of illustrating an example, assume that the value chosen by Dave 322 for random number w is "12". The value of exchange key W' calculated by Dave 322 is:

$$W'=5^{12} \bmod (563)=179 \quad (19)$$

Dave 322 transmits a request 324, that includes exchange key W', for entry into multicast group 320. Upon receiving the request 324, multicast group 320 determines whether Dave 322 is to be admitted into the multicast group as described herein.

If the multicast group 320 determines that Dave 322 is to be admitted, one of the multicast group members (Alice 302, Bob 306 or Carol 314) responds to the request by Dave 322 by transmitting a response 326 that includes the multicast group's 320 exchange key K2', where K2'=($g^{k2}$ mod (n)). For example, K2' equals ($5^{296}$ mod (563)=145).

In addition, each member of the multicast group 312 uses the exchange key W' to generate a new shared secret key k3, where k3=($Z'^{k2}$ mod (n)), for communicating with other members of the group. Thus, the value of the new shared secret key k3 is calculated by multicast group 320 as follows:

$$k3=179^{296} \bmod (563)=108 \quad (20)$$

where $$k3=(W'^{k2} \bmod (n))=\bmod (n))$$

Upon receiving response 326 from multicast group 320, Dave 322 uses the exchange key K2' to generate the new shared secret key k3, where k3=($K2'^w$ mod (n)), for communicating with other members of the group. Thus, the value of the new shared secret key k3 is calculated by Dave 322 as follows:

$$k3=145^{12} \bmod (563)=108 \quad (21)$$

where $$k3=(K2'^w \bmod (n))=(g^{kyzw} \bmod (n))$$

Figure 4:
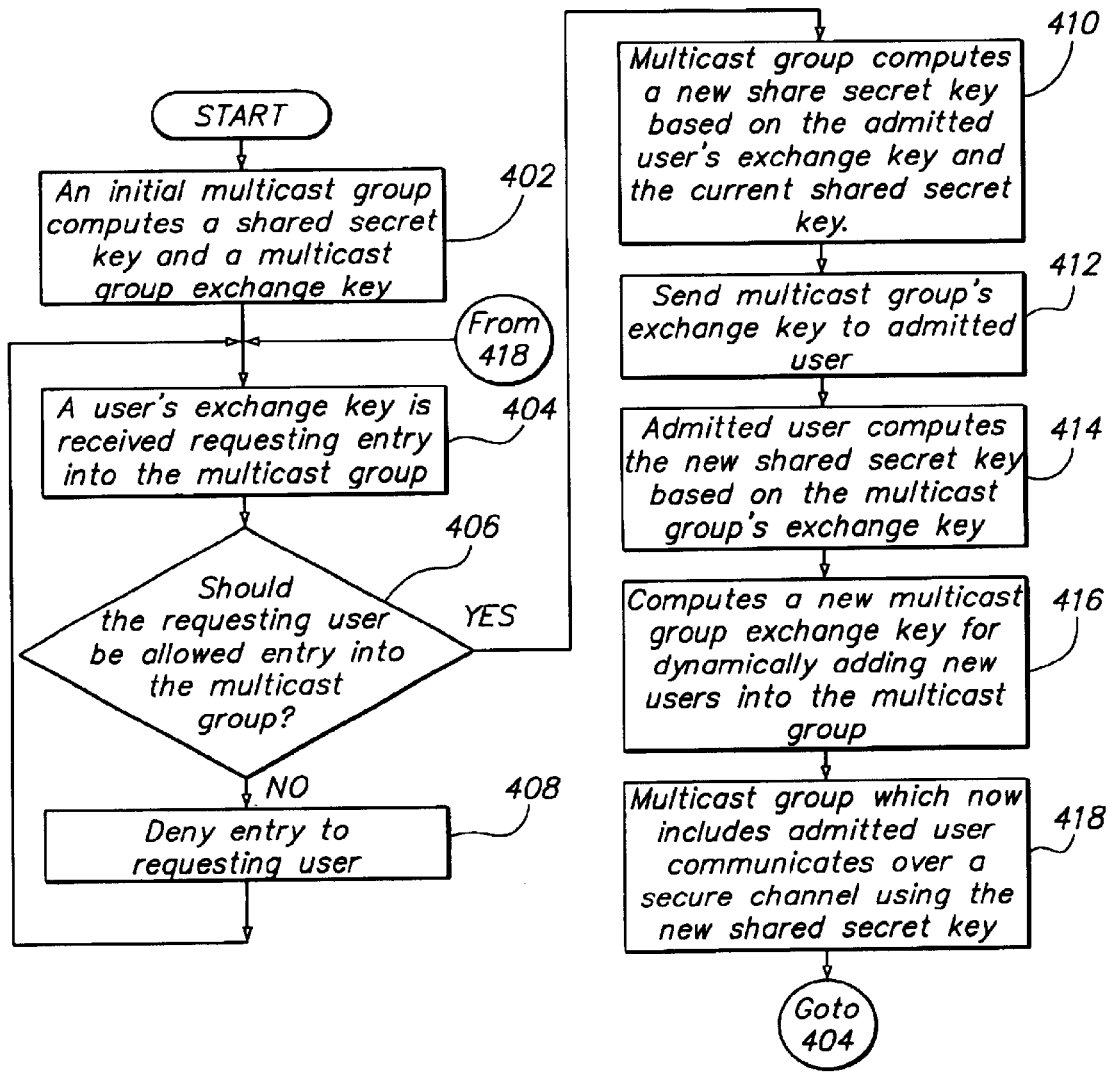
FIG. 4 is a flow diagram that illustrates a method for key exchange.

FIG. 4 is a flow diagram that illustrates a method for computing a shared secret key in a dynamically changing multicast group.

At block 402, an initial multicast group of one or more members is created. To generate the group, a shared secret key is computed for communicating among the members over a secure channel. In addition, a multicast group exchange key is generated for admitting new members into the current multicast group.

At block 404, a user request is received for entry into the multicast group. In one embodiment, the user's request includes the user's exchange key that may be used to generate a new shared secret key. At block 406, the current multicast group determines whether the requesting user should be admitted into the multicast group. If it is determined that the user should be admitted into the multicast group the process proceeds to block 410.

Alternatively, if it is determined that the user should not be admitted into the multicast group, at block 408, the requesting user is denied entry into the group. The multicast group continues to communicate through a secure channel using the current shared secret key another request for entry into the multicast group is received as illustrated in block 404.

At block 410, the current multicast group computes a new shared secret key based on the requesting user's exchange key and the previous shared secret key. At block 412, the multicast group sends the multicast group's current exchange key to the admitted user. At block 414, the admitted user computes the new shared secret key using the exchange key received from the multicast group.

At block 416 the multicast group computes a new multicast group exchange key for dynamically adding new users into the multicast group. At block 418, the new multicast group (old multicast group plus newly admitted user), communicate over a secure channel using the new shared secret key until another request for entry into the multicast group is received as illustrated in block 404.

Deleting Members from Multicast Group

Although the examples provided herein illustrate adding users to a multicast group dynamically, the techniques described are also applicable to multicast groups in which members are deleted dynamically. For example, the multicast group may desire to exclude a member who has left the group from future communications between the remaining members. In certain embodiments, when a member leaves the multicast group, a new shared secret key is generated for communicating between those members that remain in the multicast group. Using the new shared secret key, the members remaining in the multicast group can communicate over a secure channel and the departed member cannot decrypt the communications.

In one embodiment, when a person leaves the group, a new shared secret key is established using the traditional Diffie-Hellman algorithm. The remaining members may then use the newly established shared secret key to securely communicate with each other. In addition, the new members may be admitted into the group using the method described above.

Figure 3E:
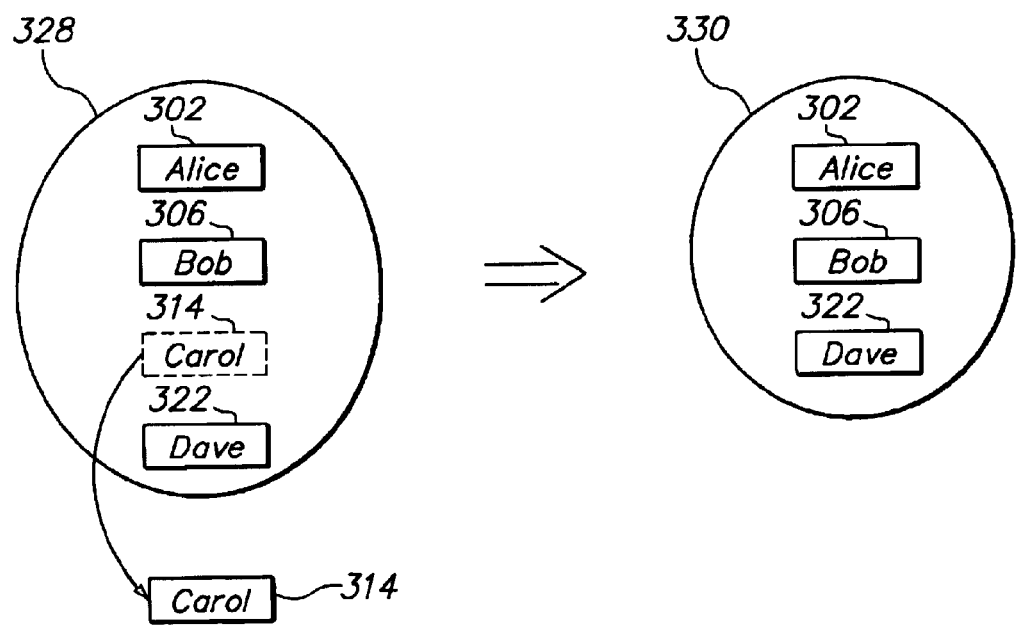
FIG. 3E is a diagram that illustrates a method for determining a shared private key when a user is dynamically removed from a multicast group.

For example, referring to FIG. 3E, if Carol 314 leaves the multicast group 328, the remaining members within multicast group 330 may establish a new secret key using the traditional Diffie-Hellman algorithm. In addition, the multicast group 330 may compute a multicast group 330 exchange key for admitting new members into the multicast group 330. For example, upon Carol 314 leaving multicast group 328, multicast group 330 may communicate with each other to compute a new shared secret key k4 using the traditional Diffie-Hellman algorithm. In addition, the multicast group 330 may compute an exchange key K3' as previously explained above, for admitting new members into the multicast group 330. For example, the exchange key K3' may be computed as $K3'=(g^{k4} \mod (n))$.

Figure 5:
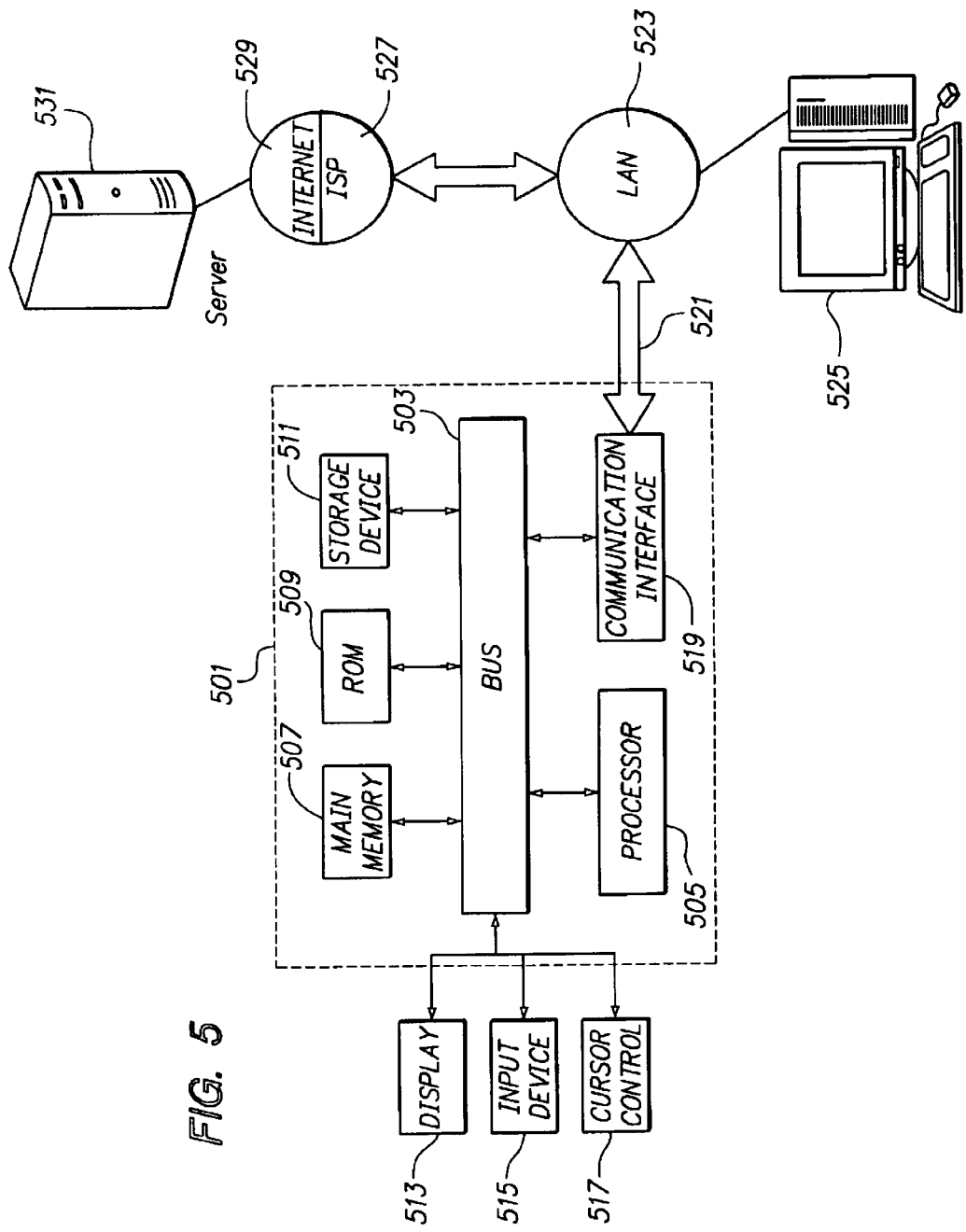
FIG. 5 is a block diagram of a computer system on which embodiments may be implemented.

FIG. 5 illustrates a computer system 501 upon which an embodiment according to the present invention may be implemented. Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

Embodiments are related to the use of computer system 501 to implement a public key exchange encryption approach for securely exchanging data between participants. According to one embodiment, the public key exchange encryption approach is provided by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

Further, the key exchange protocol may reside on a computer-readable medium. The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to computation of a public key into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection through local network 523 to a host computer 525 or to data equipment operated by an Internet Service Provider (ISP) 527. ISP 527 in turn provides data communication services through the Internet 529. Local network 523 and Internet 529 both use electrical, electromagnetic or optical signals that carry digital data streams. The signals through the various networks and the signals on network link 521 and through communication interface 519, which carry the digital data to and from computer system 501, are exemplary forms of carrier waves transporting the information.

Computer system 501 can send encrypted messages and receive data, including program code, through the network(s), network link 521 and communication interface 519. In the Internet example, a server 531 might transmit a requested code for an application program through Internet 529, ISP 527, local network 523 and communication interface 519. One such downloaded application provides a public key exchange encryption approach for securely exchanging data between participants as described herein.

The received code may be executed by processor 505 as it is received, and/or stored in storage device 511, or other non-volatile storage for later execution. In this manner, computer system 501 may obtain application code in the form of a carrier wave.

Alternatives, Extensions

The mechanism described herein provides several advantages over prior public key exchange encryption approaches for securely exchanging data among multiple participants. In particular, the described techniques provide an improved method for exchanging key information that reduces network processing delays in multicast groups whose members are dynamically change over time. As disclosed, when a user requests entry into a multicast group, the user simply broadcasts the user's exchange key to the multicast group. If it is determined that the requesting user should be admitted, only one of the multicast group members is required to broadcast the multicast group's exchange key back to the requesting user. Using the multicast group's exchange key the admitted user generates the same shared secret key that is computed by the members of the multicast group using the user's exchange key. As such, to dynamically admit a new user a maximum of N+1 messages are required to be sent, where N equals the number of members that currently exist in the multicast group.

This approach drastically reduces the number of messages that are typically required for establishing a secret key as the admitted member is no longer required to obtain the key values from each and every member within the multicast group. Instead, the current members of the multicast group all take the currently established shared secret key as a random integer (or a seed for generating a random integer) and do a Diffie-Hallman exchange with the admitted user of the group to compute the same shared secret key.

Further, the techniques described herein provide a method for reduced message traffic upon a member leaving the multicast group (M messages, where M equals the number of members remaining in the multicast group), while ensuring a secure channel of communication between the remaining members.

As explained, the described embodiments enhance the scalability of establishing a secure communication channel for dynamically changing broadcast or multicast groups and provides a high level of security while requiring relatively fewer system resources and less time to the secure communication link.

In describing certain embodiments of the invention, several drawing figures have been used for explanation purposes. However, the invention is not limited to any particular context as shown in drawing figures, and the spirit and scope of the invention include other contexts and applications in which the distributed authorization model described herein is available to other mechanisms, methods, programs, and processes. Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for providing shared secret keys for communicating through a secure channel between members of a dynamically changing multicast group connected over an insecure network, the method comprising the computer-implemented steps of:

computing a first shared secret key for establishing a first multicast group that includes a set of one or more first members;

generating a first multicast group exchange key based on the first shared secret key;

receiving a first user exchange key from a first user requesting entry into the first multicast group;

computing a second secret key k1 based on the first user exchange key and the first shared secret key according to the relation k1=(Y'$^k$ mod (n)), wherein Y' represents the first user exchange key, k represents the first shared secret key, and n is a prime number selected by the members of the multicast group and previously used to generate the first shared secret key k;

sending the first multicast group exchange key to the first user, wherein the first multicast group exchange key allows the first user to generate the second shared secret key; and establishing a second multicast group whose members include the first user and the set of one or more first members of the first multicast group, wherein the second shared secret key provides a first secure channel for communicating between members of the second multicast group over the insecure network.

2. The method as recited in claim 1, wherein the step of computing a first shared secret key includes the steps of:

selecting a private non-zero random integer "x";

selecting a public non-zero integer "g";

selecting a public prime integer "n"; and computing the first shared secret key "k" according to the relation $$k=(g^x \bmod (n)).$$

3. The method as recited in claim 2, wherein the step of generating a first multicast group exchange key includes the step computing the first multicast group exchange key K' according to the relation $$K'=(g^k \bmod (n)).$$

4. The method as recited in claim 2, wherein
the step of receiving a first user exchange key includes the step of receiving a first user exchange key value Y' computed according to the relation $$Y'=(g^y \bmod (n)),$$

wherein "y" is a private non-zero random integer selected by the first user.

5. The method as recited in claim 2, wherein the step of sending the first multicast group exchange key to the first user further comprises the first user computing the second secret key "k1" according to the relation $$k1=(K'^y \bmod (n)),$$

wherein "y" is a private non-zero random integer selected by the first user; and
wherein K' is the first multicast group exchange key.

6. The method as recited in claim 1, wherein:
the step of receiving a first user exchange key from a first user comprises the step of verifying that the first user should be allowed entry into the first multicast group; and
providing the first user with the first multicast exchange key only after the first user is verified for entry into the first multicast group.

7. The method as recited in claim 1, further comprising the steps of:
generating a second multicast group exchange key based on the second shared secret key;
receiving a second user exchange key from a second user requesting entry into the second multicast group;
computing a third secret key based on the second user exchange key and the second shared secret key;
sending the second multicast group exchange key to the second user, wherein the second multicast group exchange key allows the second user to generate the third shared secret key; and
establishing a third multicast group whose members include the second user and the members of the second multicast group, wherein the third shared secret key provides a second secure channel for communicating between members of the third multicast group over the insecure network.

8. The method as recited in claim 2, further comprising the steps of:
determining that a first departing member has left the second multicast group;
selecting a private multicast group non-zero random integer;
generating a second multicast group exchange key based on the private multicast group non-zero random integer, the public non-zero integer "g" and the public prime integer "n";
broadcasting the second multicast group exchange key to each remaining member of the second multicast group;
in response to receiving the second multicast group exchange key, each remaining member computing a third secret key based on the second multicast group exchange key and the second shared secret key; and
establishing a third multicast group whose members include only remaining members of the second multicast group, wherein the third shared secret key provides a second secure channel for communicating between members of the third multicast group over the insecure network.

9. The method as recited in claim 1, wherein the step of establishing a second multicast group requires a total of approximately N+1 messages for providing the first secure channel for communicating between members of the second multicast group over the insecure network, wherein N is a number of members of the first multicast group.

10. A computer-readable medium carrying one or more sequences of one or more instructions for communicating through a secure channel between members of a dynamically changing multicast group connected over an insecure network, and which instructions, when executed by one or more processors, cause the one or more processors to perform the steps of:
computing a first shared secret key for establishing a first multicast group that includes a set of one or more first members;
generating a first multicast group exchange key based on the first shared secret key;
receiving a first user exchange key from a first user requesting entry into the first multicast group;
computing a second secret key k1 based on the first user exchange key and the first shared secret key according to the relation k1=(Y'$^k$ mod (n)), wherein Y' represents the first user exchange key, k represents the first shared secret key, and n is a prime number selected by the members of the multicast group and previously used to generate the first shared secret key k;
sending the first multicast group exchange key to the first user, wherein the first multicast group exchange key allows the first user to generate the second shared secret key; and
establishing a second multicast group whose members include the first user and the set of one or more first members of the first multicast group, wherein the second shared secret key provides a first secure channel for communicating between members of the second multicast group over the insecure network.

11. The computer-readable medium as recited in claim 10, wherein the step of computing a first shared secret key includes the steps of:
selecting a private non-zero random integer "x";
selecting a public non-zero integer "g";
selecting a public prime integer "n"; and
computing the first shared secret key "k" according to the relation $$k=(g^x \bmod (n)).$$

12. The computer-readable medium as recited in claim 11, wherein the step of generating a first multicast group exchange key includes the step computing the first multicast group exchange key K' according to the relation $$K'=(g^k \bmod (n)).$$

13. The computer-readable medium as recited in claim 11, wherein
the step of receiving a first user exchange key includes the step of receiving a first user exchange key value Y' computed according to the relation $$Y'=(g^y \bmod (n)),$$

wherein "y" is a private non-zero random integer selected by the first user.

14. The computer-readable medium as recited in claim 11, wherein the step of sending the first multicast group exchange key to the first user further comprises the first user computing the second secret key "k1" according to the relation $$k1=(K'^y \bmod (n)),$$

wherein "y", is a private non-zero random integer selected by the first user; and wherein K' is the first multicast group exchange key.

15. The computer-readable medium as recited in claim 10, wherein:

the step of receiving a first user exchange key from a first user comprises the step of verifying that the first user should be allowed entry into the first multicast group; and providing the first user with the first multicast exchange key only after the first user is verified for entry into the first multicast group.

16. The computer-readable medium as recited in claim 10, further comprising instructions for performing the steps of:

generating a second multicast group exchange key based on the second shared secret key;

receiving a second user exchange key from a second user requesting entry into the second multicast group;

computing a third secret key based on the second user exchange key and the second shared secret key;

sending the second multicast group exchange key to the second user, wherein the second multicast group exchange key allows the second user to generate the third shared secret key; and establishing a third multicast group whose members include the second user and the members of the second multicast group, wherein the third shared secret key provides a second secure channel for communicating between members of the third multicast group over the insecure network.

17. The computer-readable medium as recited in claim 11, further comprising instructions for performing the steps of:

determining that a first departing member has left the second multicast group;

selecting a private multicast group non-zero random integer;

generating a second multicast group exchange key based on the private multicast group non-zero random integer, the public non-zero integer "g" and the public prime integer "n";

broadcasting the second multicast group exchange key to each remaining member of the second multicast group;

in response to receiving the second multicast group exchange key, each remaining member computing a third secret key based on the second multicast group exchange key and the second shared secret key; and establishing a third multicast group whose members include only remaining members of the second multicast group, wherein the third shared secret key provides a second secure channel for communicating between members of the third multicast group over the insecure network.

18. The computer-readable medium as recited in claim 10, wherein the step of establishing a second multicast group requires a total of approximately N+1 messages for providing the first secure channel for communicating between members of the second multicast group over the insecure network, wherein N is a number of members of the first multicast group.

19. A network device configured for communicating through a secure channel between members of a dynamically changing multicast group connected over an insecure network, comprising:

a network interface;

a processor coupled to the network interface and receiving information from the network interface;

a computer-readable medium accessible by the processor and comprising one or more sequences of instructions which, when executed by the processor, cause the processor to carry out the steps of:

computing a first shared secret key for establishing a first multicast group that includes a set of one or more first members;

generating a first multicast group exchange key based on the first shared secret key;

receiving a first user exchange key from a first user requesting entry into the first multicast group;

computing a second secret key k1 based on the first user exchange key and the first shared secret key according to the relation k1=(Y'$^k$ mod (n)), wherein Y' represents the first user exchange key, k represents the first shared secret key, and n is a prime number selected by the members of the multicast group and previously used to generate the first shared secret key k;

sending the first multicast group exchange key to the first user, wherein the first multicast group exchange key allows the first user to generate the second shared secret key; and establishing a second multicast group whose members include the first user and the set of one or more first members of the first multicast group, wherein the second shared secret key provides a first secure channel for communicating between members of the second multicast group over the insecure network.

20. The network device as recited in claim 19, wherein the step of computing a first shared secret key includes the steps of:

selecting a private non-zero random integer "x";

selecting a public non-zero integer "g";

selecting a public prime integer "n"; and computing the first shared secret key "k" according to the relation $$k=(g^x \bmod (n)).$$

21. The network device as recited in claim 20, wherein the step of generating a first multicast group exchange key includes the step computing the first multicast group exchange key K' according to the relation $$K'=(g^k \bmod (n)).$$

22. The network device as recited in claim 20, wherein the step of receiving a first user exchange key includes the step of receiving a first user exchange key value Y' computed according to the relation $$Y'=(g^y \bmod (n)),$$

wherein "y" is a private non-zero random integer selected by the first user.

23. The network device as recited in claim 20, wherein the step of sending the first multicast group exchange key to the first user further comprises the first user computing the second secret key "k1" according to the relation $$k1=(K'^y \bmod (n)),$$

wherein "y" is a private non-zero random integer selected by the first user; and wherein K' is the first multicast group exchange key.

24. The network device as recited in claim 19, wherein:
the step of receiving a first user exchange key from a first user comprises the step of verifying that the first user should be allowed entry into the first multicast group; and
providing the first user with the first multicast exchange key only after the first user is verified for entry into the first multicast group.

25. The network device as recited in claim 19, further comprising instructions for performing the steps of:
generating a second multicast group exchange key based on the second shared secret key;
receiving a second user exchange key from a second user requesting entry into the second multicast group;
computing a third secret key based on the second user exchange key and the second shared secret key;
sending the second multicast group exchange key to the second user, wherein the second multicast group exchange key allows the second user to generate the third shared secret key; and
establishing a third multicast group whose members include the second user and the members of the second multicast group, wherein the third shared secret key provides a second secure channel for communicating between members of the third multicast group over the insecure network.

26. The network device as recited in claim 20, further comprising instructions for performing the steps of:
determining that a first departing member has left the second multicast group;
selecting a private multicast group non-zero random integer;
generating a second multicast group exchange key based on the private multicast group non-zero random integer, the public non-zero integer "g" and the public prime integer "n";
broadcasting the second multicast group exchange key to each remaining member of the second multicast group;
in response to receiving the second multicast group exchange key, each remaining member computing a third secret key based on the second multicast group exchange key and the second shared secret key; and
establishing a third multicast group whose members include only remaining members of the second multicast group, wherein the third shared secret key provides a second secure channel for communicating between members of the third multicast group over the insecure network.

27. The network device as recited in claim 19, wherein the step of establishing a second multicast group requires a total of approximately N+1 messages for providing the first secure channel for communicating between members of the second multicast group over the insecure network, wherein N is a number of members of the first multicast group.

28. A network device configured for communicating through a secure channel between members of a dynamically changing multicast group connected over an insecure network, comprising:
means for computing a first shared secret key for establishing a first multicast group that includes a set of one or more first members;
means for generating a first multicast group exchange key based on the first shared secret key;
means for receiving a first user exchange key from a first user requesting entry into the first multicast group;
means for computing a second secret key k1 based on the first user exchange key and the first shared secret key according to the relation k1=($Y'^k$ mod (n)), wherein Y' represents the first user exchange key, k represents the first shared secret key, and n is a prime number selected by the members of the multicast group and previously used to generate the first shared secret key k;
means for sending the first multicast group exchange key to the first user, wherein the first multicast group exchange key allows the first user to generate the second shared secret key; and
means for establishing a second multicast group whose members include the first user and the set of one or more first members of the first multicast group, wherein the second shared secret key provides a first secure channel for communicating between members of the second multicast group over the insecure network.

29. A method for generating a shared secret key for use by a first member, a second member, and a third member who joins the first member and the second member for secure communication as a multicast group over an insecure network, the method comprising the computer-implemented steps of:
generating a first multicast group exchange key K' based on a first shared secret key "k" that is used by a first multicast group that includes the first member and the second member, wherein k=($g^x$ mod (n)), "x" is a private non-zero random integer, "g" is a public non-zero integer, and "n" is a pre-determined public prime integer, and wherein K'=($g^k$ mod (n));
receiving a first user exchange key from the third member as part of a request by the third member to enter the first multicast group;
sending the first multicast group exchange key to the first member, wherein the first multicast group exchange key allows the first member to generate a second secret key k1 based on the first user exchange key and the first shared secret key according to the relation k1=($Y'^k$ mod (n)), wherein Y' represents the first user exchange key, k represents the first shared secret key, and n is a prime number selected by the members of the multicast group and previously used to generate the first shared secret key k; and
establishing secure communication in a second multicast group whose members include the first member, the second member and the third member, and based on the second shared secret key.

30. The method as recited in claim 29, wherein
the step of receiving a first user exchange key includes the step of receiving a first user exchange key value Y' computed according to the relation $$Y'=(g^y \bmod (n)),$$

wherein "y" is a private non-zero random integer selected by the first member.

31. The method as recited in claim 29, wherein the step of sending the first multicast group exchange key to the first member further comprises the first member computing the second secret key "k1" according to the relation $$k1=(K'^y \bmod (n)).$$

32. The method as recited in claim 29, wherein the step of receiving a first user exchange key from a first member comprises the step of providing the first user with the first multicast exchange key only after verifying that the first user is allowed to enter the first multicast group.

33. The method as recited in claim 29, further comprising the steps of:
determining that a first departing member has left the second multicast group;

selecting a private multicast group non-zero random integer;

generating a second multicast group exchange key based on the private multicast group non-zero random integer, the public non-zero integer "g" and the public prime integer "n";

broadcasting the second multicast group exchange key to each remaining member of the second multicast group;

in response to receiving the second multicast group exchange key, each remaining member computing a third secret key based on the second multicast group exchange key and the second shared secret key; and establishing a third multicast group whose members include only remaining members of the second multicast group, wherein the third shared secret key provides a second secure channel for communicating between members of the third multicast group over the insecure network.

34. The method as recited in claim 1, wherein:

the first user exchange key is received by a particular first member of the set of one or more first members;

further comprising the step of the particular first member sending the first user exchange key to the other first members of the set of one or more first members; and wherein each first member of the set of one or more first members computes the second secret key k1 based on the first user exchange key and the first shared secret key according to the relation $k1=(Y'^k \mod (n))$, wherein Y' represents the first user exchange key, k represents the first shared secret key, and n is a prime number selected by the members of the multicast group and previously used to generate the first shared secret key k.

35. The method as recited in claim 1, wherein:

the first user exchange key is received by a particular first member of the set of one or more first members;

the other first members of the set of one or more first members receive the first user exchange key from the first user; and each first member of the set of one or more first members computes the second secret key k1 based on the first user exchange key and the first shared secret key according to the relation $k1=(Y'^k \mod (n))$, wherein Y' represents the first user exchange key, k represents the first shared secret key, and n is a prime number selected by the members of the multicast group and previously used to generate the first shared secret key k.

36. The method as recited in claim 1, wherein:

the set of one or more first members is a set of one or more first workstations; and the first user is a second workstation.

37. The computer-readable medium as recited in claim 10, wherein:

the first user exchange key is received by a particular first member of the set of one or more first members;

further comprising instructions for performing the step of the particular first member sending the first user exchange key to the other first members of the set of one or more first members; and wherein each first member of the set of one or more first members computes the second secret key k1 based on the first user exchange key and the first shared secret key according to the relation $k1=(Y'^k \mod (n))$, wherein Y' represents the first user exchange key, k represents the first shared secret key, and n is a prime number selected by the members of the multicast group and previously used to generate the first shared secret key k.

38. The computer-readable medium as recited in claim 10, wherein:

the first user exchange key is received by a particular first member of the set of one or more first members;

the other first members of the set of one or more first members receive the first user exchange key from the first user; and each first member of the set of one or more first members computes the second secret key k1 based on the first user exchange key and the first shared secret key according to the relation $k1=(Y'^k \mod (n))$, wherein Y' represents the first user exchange key, k represents the first shared secret key, and n is a prime number selected by the members of the multicast group and previously used to generate the first shared secret key k.

39. The computer-readable medium as recited in claim 10, wherein:

the set of one or more first members is a set of one or more first workstations; and the first user is a second workstation.

40. The network device as recited in claim 19, wherein:

the first user exchange key is received by a particular first member of the set of one or more first members;

the computer-readable medium further comprises instructions for performing the step of the particular first member sending the first user exchange key to the other first members of the set of one or more first members; and wherein each first member of the set of one or more first members computes the second secret key k1 based on the first user exchange key and the first shared secret key according to the relation $k1=(Y'^k \mod (n))$, wherein Y' represents the first user exchange key, k represents the first shared secret key, and n is a prime number selected by the members of the multicast group and previously used to generate the first shared secret key k.

41. The network device as recited in claim 19, wherein:

the first user exchange key is received by a particular first member of the set of one or more first members;

the other first members of the set of one or more first members receive the first user exchange key from the first user; and each first member of the set of one or more first members computes the second secret key k1 based on the first user exchange key and the first shared secret key according to the relation $k1=(Y'^k \mod (n))$, wherein Y' represents the first user exchange key, k represents the first shared secret key, and n is a prime number selected by the members of the multicast group and previously used to generate the first shared secret key k.

42. The network device as recited in claim 19, wherein:

the set of one or more first members is a set of one or more first workstations; and the first user is a second workstation.

43. The network device as recited in claim 28, wherein the means for computing a first shared secret key includes:

means for selecting a private non-zero random integer "x";

means for selecting a public non-zero integer "g";

means for selecting a public prime integer "n"; and means for computing the first shared secret key "k" according to the relation $k=(g^x \mod (n))$.

44. The network device as recited in claim 43, wherein the means for generating a first multicast group exchange key includes means for computing the first multicast group exchange key K' according to the relation $$K' = (g^k \bmod (n)).$$

45. The network device as recited in claim 43, wherein the means for receiving a first user exchange key includes means for receiving a first user exchange key value Y' computed according to the relation $$Y' = (g^y \bmod (n)),$$

wherein "y" is a private non-zero random integer selected by the first user.

46. The network device as recited in claim 43, wherein the means for sending the first multicast group exchange key to the first user further comprises means for the first user computing the second secret key "k1" according to the relation $$k1 = (K'^y \bmod (n)),$$

wherein "y" is a private non-zero random integer selected by the first user; and
wherein K' is the first multicast group exchange key.

47. The network device as recited in claim 28, wherein:
the means for receiving a first user exchange key from a first user comprises means for verifying that the first user should be allowed entry into the first multicast group; and
means for providing the first user with the first multicast exchange key only after the first user is verified for entry into the first multicast group.

48. The network device as recited in claim 28, further comprising:
means for generating a second multicast group exchange key based on the second shared secret key;
means for receiving a second user exchange key from a second user requesting entry into the second multicast group;
means for computing a third secret key based on the second user exchange key and the second shared secret key;
means for sending the second multicast group exchange key to the second user, wherein the second multicast group exchange key allows the second user to generate the third shared secret key; and
means for establishing a third multicast group whose members include the second user and the members of the second multicast group, wherein the third shared secret key provides a second secure channel for communicating between members of the third multicast group over the insecure network.

49. The network device as recited in claim 43, further comprising:
means for determining that a first departing member has left the second multicast group;
means for selecting a private multicast group non-zero random integer;

means for generating a second multicast group exchange key based on the private multicast group non-zero random integer, the public non-zero integer "g" and the public prime integer "n";
means for broadcasting the second multicast group exchange key to each remaining member of the second multicast group;
means for, in response to receiving the second multicast group exchange key, each remaining member computing a third secret key based on the second multicast group exchange key and the second shared secret key; and
means for establishing a third multicast group whose members include only remaining members of the second multicast group, wherein the third shared secret key provides a second secure channel for communicating between members of the third multicast group over the insecure network.

50. The network device as recited in claim 28, wherein the means for establishing a second multicast group requires a total of approximately N+1 messages for providing the first secure channel for communicating between members of the second multicast group over the insecure network, wherein N is a number of members of the first multicast group.

51. The network device as recited in claim 28, wherein:
the first user exchange key is received by a particular first member of the set of one or more first members;
further comprising means for the particular first member sending the first user exchange key to the other first members of the set of one or more first members; and
wherein each first member of the set of one or more first members computes the second secret key k1 based on the first user exchange key and the first shared secret key according to the relation $k1 = (Y'^k \bmod (n))$, wherein Y' represents the first user exchange key, k represents the first shared secret key, and n is a prime number selected by the members of the multicast group and previously used to generate the first shared secret key k.

52. The network device as recited in claim 28, wherein:
the first user exchange key is received by a particular first member of the set of one or more first members;
the other first members of the set of one or more first members receive the first user exchange key from the first user; and
each first member of the set of one or more first members computes the second secret key k1 based on the first user exchange key and the first shared secret key according to the relation $k1 = (Y'^k \bmod (n))$, wherein Y' represents the first user exchange key, k represents the first shared secret key, and n is a prime number selected by the members of the multicast group and previously used to generate the first shared secret key k.

53. The network device as recited in claim 28, wherein:
the set of one or more first members is a set of one or more first workstations; and
the first user is a second workstation.

* * * * *